United States Patent [19]

Laroche et al.

[11] Patent Number: 4,585,842

[45] Date of Patent: Apr. 29, 1986

[54] METHOD OF TREATING A POLYMERIZING REACTOR

[75] Inventors: Paul Laroche; Jean-Bernard Pompon, both of Saint Auban, France

[73] Assignee: Chloe Chimie, France

[21] Appl. No.: 387,923

[22] Filed: Jun. 14, 1982

[30] Foreign Application Priority Data

Mar. 26, 1982 [FR] France .................................. 82 05143

[51] Int. Cl.⁴ ............................................. C08F 10/00
[52] U.S. Cl. ...................................... 526/62; 427/230; 427/236
[58] Field of Search ..................... 526/62, 74; 427/236; 422/131; 427/230, 238, 239

[56] References Cited

U.S. PATENT DOCUMENTS

| 1,942,531 | 1/1934 | Bane | 526/62 |
| 3,778,423 | 12/1973 | Reiter | 526/62 |
| 4,024,330 | 5/1977 | Morningstar | 526/62 |
| 4,093,787 | 6/1978 | Burgess | 526/62 |
| 4,182,809 | 1/1980 | Hang | 526/62 |

FOREIGN PATENT DOCUMENTS 0021436  2/1980  Japan ................................... 526/62

Primary Examiner—Sam Silverbere
Attorney, Agent, or Firm—McDougall, Hersh & SCott

[57] ABSTRACT

A polymerization reactor in which the surfaces therein, which are exposed to the polymerization medium, are provided with a coating of a resin extracted from pine wood whereby polymer deposits on such surfaces are substantially reduced and/or easily removed, and method for treatment of same.

15 Claims, No Drawings

METHOD OF TREATING A POLYMERIZING REACTOR

The invention concerns a process of treating a polymerising reactor. It also concerns the polymerising reactor treated by the said process.

One purpose of the invention is subtantially to reduce the formation of polymer deposits on the internal surfaces of a polymerising reactor, when a monomeric composition based on vinyl chloride is polymerised therein.

Other aims and advantages will emerge from the following description.

In this description the expression "monomeric composition based on vinyl chloride" or, more briefly, "monomeric composition" refers to vinyl chloride alone or mixed with at least one other monomer which can be copolymerised with vinyl chloride. The monomeric composition based on vinyl chloride contains at least 70% by weight of vinyl chloride. The copolymerisable monomers are those generally employed in conventional methods of copolymerising vinyl chloride. Some examples are vinyl esters of mono- and poly-carboxylic acids, such as vinyl acetate, propionate and benzoate; unsaturated mono- and polycarboxylic acids, such as acrylic, methacrylic, maleic, fumaric and itaconic acids, their aliphatic, cycloaliphatic and aromatic esters, their amides and their nitriles; alkyl, vinyl and vinylidene halides; alkylvinyl ethers and olefins.

There are various polymerising processes that are normally carried out in reactors which have one or more agitators and are frequently equipped with auxiliary fittings such as deflector(s) and possibly condenser cooler(s), for extracting heat from the contents of the reactor. In many cases these processes leave undesirable polymer deposits on the internal surfaces of the reactor during the polymerising reaction. Not only do these deposits hinder heat transfer from the inside to the outside of the reactor; they also reduce productivity and have an unfavourable effect on the quality of the polymer.

The problem is particularly serious when vinyl chloride polymers are produced industrially, in the form of discrete particles, by polymerising a monomeric composition in aqueous suspension. When such a polymerising process is used, the vinyl chloride and any other monomers are kept in the form of separate droplets, by using suspending agents and agitation. Once the reaction is over the polymer obtained is dried. These reactions involving polymerisation in an aqueous suspension are generally carried out under pressure, in metal reactors equipped with one or more agitators revolving at high speed, one or more deflectors, and possibly one or more condenser coolers. During the polymerising reaction, vinyl chloride polymer forms deposits on the internal surfaces of the reactor and any condenser coolers, and also on the surfaces of the agitators and deflectors. It is obviously necessary to remove the polymer deposits, since they in turn cause other polymer deposits to form on the internal surfaces of the reactor, thus leading to the formation of a crust, which impedes heat transfer and contaminates the polymer formed.

The nature of the polymer deposit on the internal walls of the reactor is such that, in industrial production of the polymers described above, the current practice in the past has been to open the reactor and scrape the polymer deposit on the walls, agitators and deflectors by hand. An operation of this type is not only expensive but has health hazards for the operator. A variety of methods have already been proposed for removing the polymer deposits from the surfaces of the polymerising reactor, particularly cleaning with solvents, by hydraulic means under high pressure (300 to 400 bars) and by mechanical means, but there is no method that has proved to be both perfectly effective and economic.

It has also been proposed to coat the internal surfaces of reactors with various chemical substances, used in solution form, to prevent polymer from being deposited on the surfaces. However, there is a danger that the chemical substances so far proposed may lower the quality of the polymers or copolymers obtained: since they are made of molecules of small dimensions, they may easily migrate within the polymers or copolymers being formed. In addition they often bring a danger of toxicity.

Reactors treated by the method of the invention do not have these disadvantages.

In the method of the invention, a coating solution containing resin extracted from pine wood is applied to the internal surfaces of the polymerising reactor.

In the description the words "resin extracted from pine wood" refer to the resin which is left when pine oil, turpentine and rosin have been separated from the pine wood extract obtained with a solvent which can extract the rosin and resinous substances other than rosin from pine wood under cold conditions. Such a solvent may be e.g. a hydrocarbon extracted from coal tar such as benzol, toluol or xylol. The resin may be prepared by the methods described in U.S. Pat. No. 2,193,026. It is a resin with a high melting point and a dark colour, comprising a complex mixture of resinous constituents which are not chemically defined; these include inter alia oxidised resinic acids, oxidised terpenes, polymerised terpenes, polyphenols and highly complex woody substances.

Applicants have in fact found that, when the internal surfaces of the polymerising reactor and particularly a reactor with internal walls made of stainless steel, are covered with a coating containing the said resin, there is a substantial reduction in the formation of polymer deposits on those surfaces, when a monomeric composition based on vinyl chloride is polymerised in the reactor. It should be noted that this coating behaves equally well on the internal surfaces of a reactor with a glazed internal coating and on those of a reactor where the internal walls are made of stainless steel.

To achieve the aims of the invention, the coating solution used should generally contain 1 to 10% and preferably 2 to 5% by weight of resin extracted from pine wood.

The coating solution according to the invention comprises an aqueous solution of alkaline hydroxide or at least one organic solvent.

Some examples of the alkaline hydroxides are sodium hydroxide, potassium hydroxide, lithium hydroxide and ammonium hydroxide. The aqueous coating solutions according to the invention have a pH generally above 10 and usually from 11 to 12. They generally contain 0.3 to 3% by weight of alkaline hydroxide.

The organic solvent used is preferably a solvent which is volatile enough to enable the coating to dry rapidly before the polymerising ingredients are introduced. Some examples are alcohols such as methyl alcohol, ethyl alcohol and cyclohexanol; ketones such as acetone, methylethylketone and methylisobutylketone; and chlorinated hydrocarbons such as chloroform and trichloroethane.

The coating solutions according to the invention are obtained by conventional methods, generally involving agitation and possibly heat. When preparing an aqueous coating solution it is generally possible to operate at any temperature from 0 to 100° C., and the normal practice is to operate at a temperature of from 20° C. to 50° C. When preparing a coating solution in an organic solvent one would usually operate at ambient temperature.

The nature of the coating solution enables it to be applied to the internal surfaces of the reactor without the reactor having to be opened.

In the method of the invention the coating solution is applied to the internal surfaces of the polymerising reactor by any appropriate means, such as a paint brush, other types of brush or spraying, but preferably by spraying. All the exposed surfaces inside the reactor are treated in the same way, e.g. those of the agitator or agitators, deflector or deflectors and any condenser cooler or coolers. The coating solution is applied in the form of a layer which generally contains from 0.2 to 2 g of resin per m², after any of the solution has run down.

In accordance with the invention, many polymerising operations can be carried out without opening the reactor in between. In cases where a polymer deposit is formed on the surfaces of the reactor, it can easily be removed without having recourse to manual scraping or hydraulic cleaning under high pressure. In an experimental series over 150 operations, of polymerising vinyl chloride in suspension, have been carried out in a 25 m³ reactor with its internal surfaces covered with a coating according to the invention, without any preliminary mechanical surface treatment such as polishing. A fresh coating was applied to the surfaces between operations without opening the reactor, by means of spray nozzles mounted on the reactor. At the end of the experiment, when the reactor was opened, there was found to be only a thin deposit on the internal surfaces of the reactor, and this was easily removed, simply by rinsing with a jet of water at low pressure (4 to 5 bars).

Although many operations can be carried out without renewing the surface coating, it has been found preferable to coat the internal surfaces of the reactor before each operation, in order to maximise the advantages provided by the process. All the internal surfaces of the reactor can be reached by using nozzles mounted permanently at appropriate points in the reactor. When it is decided to coat the reactor, it is first emptied and the internal surfaces rinsed with water. The coating solution is sprayed onto the surfaces through nozzles. Any excess coating solution is then allowed to run out of the reactor and, if so desired, passed into a recovery system. All the polymerisation ingredients can then be placed immediately in the reactor in the usual way, and the polymerising operation can be started without the presence of the coating necessitating any change in operating methods. Furthermore, the presence of the coating on the internal walls of the reactor treated by the method of the invention does not in any way impair the quality of the polymer produced.

Although the method of the invention, which concerns the treatment of a polymerising reactor and in particular a reactor for polymerising a monomeric composition based on vinyl chloride, is specifically described in connection with reactors using the technique of polymerisation in suspension, it can also be applied successfully to the treatment of polymerising reactors which use the techniques of polymerisation in emulsion, in microsuspension or in a mass. In these various techniques the monomeric composition based on vinyl chloride is generally polymerised at a temperature of 10° to 90° C. and preferably 40° to 75° C., and the polymerising reaction generally takes from 8 to 20 hours.

The invention also concerns a polymerising reactor where the internal surfaces are covered with a coating containing resin extracted from pine wood. The coating generally contains from 0.2 to 2 g of such resin per m².

The following examples are given to illustrate the invention.

The polymerising reactors used in the examples are fitted with a deflector and an agitator of the impeller type with 3 blades.

EXAMPLE 1

A coating solution containing 3% by weight of resin, extracted from pine wood, in acetone is prepared by agitation at room temperature. Both surfaces of a rectangular stainless steel plate measuring 10×6 cm, which has been cleaned and degreased, are coated by a paint brush with the above mentioned coating solution containing 1.6 g of resin per m². The weight of the plate and that of a control plate are recorded.

The two plates are fixed to the internal wall of an 800 liter polymerising reactor. 360 kg of deionised water is placed in the reactor, and its agitating speed is set to 200 rpm. 240 g of partially hydrolysed polyvinyl alcohol and 96 g of isopropyl peroxydicarbonate are also introduced then, when the reactor has been closed and put under vacuum, 280 kg of vinyl chloride and 20 kg of vinyl acetate.

The temperature of the reaction medium is brought to 52° C., corresponding to a relative pressure of 7.5 bars. This temperature is maintained until the relative pressure in the reactor drops to 4.5 bars. Polymerisation at 52° C. takes 12 hours.

When the unreacted monomeric composition has been degassed and the reactor emptied, the two plates are removed from the reactor and left to dry.

The weight of each plate is recorded again, and their increase in weight and the quantity of deposit per unit of area are deduced therefrom.

The weights obtained are set out in table 1.

TABLE 1

| | Before polymerisation Weight (g) | After polymerisation Weight (g) | Increase in weight (g) | Quantity of deposit (g/m²) |
|---|---|---|---|---|
| Control plate | 93.920 | 96.651 | 2.731 | 227.6 |
| Plate treated by the coating solution containing resin extracted from pine wood | 95.610 | 95.726 | 0.116 | 9.6 |

It will be seen that after polymerisation the quantity of deposit on the control plate is over 20 times greater than that on the plate treated with the coating solution containing resin extracted from pine wood.

EXAMPLE 2

A coating solution containing 3% by weight of resin extracted from pine wood, in an aqueous solution containing 1% by weight of sodium hydroxide, is prepared by agitation at 40° C. The pH of the coating solution is 11.2. A layer of the coating solution, containing 1 g of resin per m² when the excess has run down, is applied with a paint brush to the internal surfaces of a 20 liter polymerising reactor made of stainless steel.

9 kg of deionised water is placed in the reactor, and the agitating speed is set to 120 rpm. 6 g of partially hydrolysed polyvinyl alcohol and 2 g of cyclohexyl peroxydicarbonate are also introduced, then, when the reactor has been closed and put under vacuum, 6 kg of vinyl chloride.

The temperature of the reaction medium is brought to 60° C., corresponding to a relative pressure of 9 bars. When the reaction medium has polymerised for 1 hour at 60° C., the agitating speed is set to 150 rpm. This temperature is maintained until the relative pressure in the reactor drops to 7.5 bars. Polymerisation at 60° C. takes 12 hours.

The unreacted monomer is degassed and the reactor emptied.

EXAMPLE 3

A coating solution containing 3% by weight of resin, extracted from pine wood, in an aqueous solution containing 1.2% by weight of potassium hydroxide, is prepared by agitation at 40° C. The pH of the coating solution is 10.6. A layer of it, containing 0.8 g of resin per m² when the excess solution has run down, is applied with a paint brush to the internal surfaces of a 20 liter stainless steel polymerising reactor.

8.5 kg of deionised water is placed in the reactor, and the agitating speed is set to 180 rpm. 7.7 g of partially hydrolysed polyvinyl alcohol, 3.1 g of lauroyl peroxide and 0.35 g of cyclohexyl peroxydicarbonate are also placed in the reactor, followed by 5.6 kg of vinyl chloride when the reactor has been closed and put under vacuum.

The temperature of the reaction medium is brought to 69° C., corresponding to a relative pressure of 11.5 bars. This temperature is maintained until the relative pressure in the reactor drops to 8.5 bars. Polymerisation takes 9 hours at 69° C.

The unreacted monomer is degassed and the reactor emptied.

EXAMPLE 4

A coating solution containing 1.5% by weight of resin, extracted from pine wood, in methylene chloride is prepared by agitation at room temperature. A layer of it, containing 1.5 g of resin per m² when the excess has run down, is applied with a paint brush to the internal surfaces of a stainless steel 20 liter polymerising reactor.

9 kg of deionised water is placed in the reactor, and the agitating speed is set to 210 rpm. 6 g of partially hydrolysed polyvinyl alcohol and 2.2 g of isopropyl peroxydicarbonate are also introduced, followed by 5.2 kg of vinyl chloride and 0.4 kg of vinyl acetate when the reactor has been closed and put under vacuum.

The temperature of the reaction medium is brought to 62° C., corresponding to a relative pressure of 9.5 bars. This temperature is maintained until the relative pressure in the reactor drops to 5 bars. Polymerisation at 62° C. is continued for 13 hours.

The unreacted monomeric composition is degassed and the reactor emptied.

EXAMPLE 5

A coating solution containing 8% by weight of resin, extracted from pine wood, in acetone is prepared by agitation at room temperature. A layer of it, containing 0.25 g of resin per m² when the excess has run down, is sprayed onto the internal surfaces of an 800 liter polymerising reactor with a glazed internal coating.

340 kg of deionised water is placed in the reactor, and the agitating speed is set to 120 rpm. 240 g of partially hydrolysed polyvinyl alcohol and 94 g of isopropyl peroxydicarbonate are also introduced, followed by 210 kg of vinyl chloride and 18 kg of vinyl acetate when the reactor has been closed and put under vacuum.

The temperature of the reaction medium is brought to 64° C., corresponding to a relative pressure of 10 bars. After 30 minutes' polymerisation at 64° C. the agitating speed is set to 200 rpm.

This temperature is maintained until the relative pressure in the reactor drops to 3.5 bars. The polymerising time at 64° C. is 13 hours.

The unreacted monomeric composition is degassed and the reactor emptied.

EXAMPLE 6

A coating solution containing 2.5% by weight of resin, extracted from pine wood, in an aqueous solution containing 0.8% by weight of ammonium hydroxide, is prepared by agitation at 40° C. The pH of the coating solution is 10.5. A layer of the solution, containing 0.5 g of resin per m² when the excess has run down, is sprayed onto the internal surfaces of an 800 liter stainless steel polymerising reactor.

480 kg of deionised water is placed in the reactor, and the agitating speed is set to 110 rpm. 200 g of an aqueous solution containing 3% by weight of methyl cellulose, 200 g of partially hydrolysed polyvinyl alcohol, 70 g of lauroyl peroxide and 60 g of cyclohexyl peroxydicarbonate are also introduced, followed by 310 kg of vinyl chloride and 19 kg of vinyl acetate when the reactor has been closed and put under vacuum.

The temperature of the reaction medium is brought to 62° C., corresponding to a relative pressure of 9.5 bars. After 20 minutes' polymerisation at 62° C. the agitating speed is set to 190 rpm. This temperature is maintained until the relative pressure in the reactor drops to 5 bars. Polymerisation at 62° C. is carried out for 11 hours.

The unreacted monomeric composition is degassed and the reactor emptied.

EXAMPLE 7

A coating solution containing 2% by weight of resin, extracted from pine wood, in methyl alcohol is prepared by agitation at room temperature. A layer of the solution, containing 0.4 g of resin per m² when the excess has run down, is sprayed onto the internal surfaces of an 800 liter stainless steel polymerising reactor.

360 kg of deionised water is placed in the reactor, and the agitating speed is set to 220 rpm. 240 g of partially hydrolysed polyvinyl alcohol and 96 g of cyclohexyl peroxydicarbonate are also introduced, followed by 300 kg of vinyl chloride when the reactor has been closed and put under vacuum.

The temperature of the reaction medium is brought to 69° C., corresponding to a relative pressure of 11.5 bars. This temperature is maintained until the relative pressure in the reactor drops to 7 bars. Polymerisation at 69° C. is carried on for 10 hours.

The unreacted monomer is degassed and the reactor emptied.

EXAMPLE 8

A coating solution containing 3% by weight of resin, extracted from pine wood, in an aqueous solution containing 1% by weight of sodium hydroxide, is prepared by agitation at 40° C. A layer of the coating solution is applied to the internal surfaces of a 25 m$^3$ stainless steel polymerising reactor, by means of spray nozzles mounted on said autoclave. When the excess solution has run off, the said layer contains 0.8 g of resin per m$^2$.

11 t of deionised water is placed in the reactor, and the agitating speed is set to 120 rpm. 6 kg of partially hydrolysed polyvinyl alcohol and 1.5 kg of cyclohexyl peroxydicarbonate are also introduced, followed by 8 t of vinyl chloride when the reactor has been closed and put under vacuum.

The temperature of the reaction medium is brought to 58° C., corresponding to a relative pressure of 8.5 bars. This temperature is maintained until the relative pressure in the reactor drops to 7 bars. The polymerising process at 58° C. takes 8.5 hours.

The unreacted monomer is degassed and the reactor emptied.

Comparative tests 2A to 8A

Tests 2A to 8A correspond respectively to examples 2 to 8 and each consist of a polymerising operation. The apparatus and polymerising conditions are the same as those in the said examples, but the reactor is not previously treated in accordance with the invention.

When the reactor has been emptied the following is observed:

In examples 2 to 8 the presence of a very small quantity of deposits on the internal surfaces of the reactor: these are easily removed with a jet of water at low pressure (4 bars).

In tests 2A to 8A the presence of thick deposits on the internal surfaces of the reactor: these require manual scraping and/or hydraulic cleaning under high pressure (300 bars) to remove them.

Table 2 shows the quantities of deposit removed for each of examples 2 to 8 and each of comparative tests 2A to 8A.

TABLE 2

| Examples | | Comparative tests | |
|---|---|---|---|
| References | Quantities of deposit removed (g) | References | Quantities of deposit removed (g) |
| 2 | 5 | 2A | 75 |
| 3 | 5 | 3A | 75 |
| 4 | 10 | 4A | 110 |
| 5 | 110 | 5A | 2000 |
| 6 | 90 | 6A | 1100 |
| 7 | 100 | 7A | 1900 |
| 8 | 1500 | 8A | 18000 |

EXAMPLES 9 AND 10

Examples 9 and 10 each consist of a series of 50 polymerising operations which are carried out without cleaning the reactor in between. The apparatus, treatment of the reactor and polymerising conditions are the same as those in examples 6 and 7. The reactor is treated before each polymerising operation.

At the end of each series of polymerising operations, when the reactor has been emptied, the internal walls of the reactor are found to carry only 100 g of deposits in example 9 and 120 g in example 10, and these are easily removed with a jet of water at low pressure (4 bars).

EXAMPLE 11

Example 11 consists of three series of 50, 100 and 200 polymerising operations respectively, which are carried out without cleaning the reactor in between. The apparatus, treatment of the reactor and polymerising conditions are the same as those in example 8. The reactor is treated before each polymerising operation.

At the end of each series of 50 and 100 polymerising operations, when the reactor has been emptied, its internal surfaces are found to carry only 1800 g and 2200 g of deposits respectively, and these are easily removed with a jet of water at low pressure (4 bars).

At the end of the series of 200 polymerising operations, when the reactor is emptied, it is found to carry only 3000 g of deposits.

We claim:

1. A method of treating a polymerization reactor to minimize polymer build-up thereon comprising coating the internal surfaces within the reactor with a resin extracted from pine wood prior to carrying out the polymerization reaction in the reactor.

2. The method as claimed in claim 1 in which the coating is applied onto the surfaces within the reactor in the form of a solution containing resin extracted from pine wood.

3. The method as claimed in claim 2 in which the solution contains 1 to 10% by weight of the resin extracted from pine wood.

4. The method as claimed in claim 2 in which the coating solution contains 2 to 5% by weight of the resin extracted from pine wood.

5. The method as claimed in claim 2 in which the coating solution comprises an aqueous solution of an alkaline hydroxide.

6. The method as claimed in claim 5 in which the alkaline hydroxide is selected from the group consisting of sodium hydroxide, potassium hydroxide, lithium hydroxide and ammonium hydroxide.

7. The method as claimed in claim 5 in which the pH of the solution is above 10.

8. The method as claimed in claim 2 in which the coating solution comprises at least one organic solvent.

9. The method as claimed in claim 8 in which the organic solvent is selected from the group consisting of alcohols, ketones and chlorinated hydrocarbons.

10. The method as claimed in claim 8 in which the organic solvent is selected from the group consisting of methyl alcohol, ethyl alcohol, cyclohexanol, acetone, methylethyl ketone, methylisobutylketone, chloroform and trichloroethane.

11. The method as claimed in claim 2 in which the coating solution is applied in the form of a layer containing 0.2 to 2.0 grams per m$^2$ of resin extracted from pine wood.

12. The method as claimed in claim 2 in which the coating solution is applied by spraying the coating solution onto the internal surfaces of the reactor.

13. The method as claimed in claim 2 in which the coating solution is applied by brushing the coating solution onto the internal surfaces of the reactor.

14. The method as claimed in claim 2, in which the coating solution is applied prior to each polymerization reaction.

15. The method as claimed in claim 2 in which the internal surfaces of the reactor are coated after a number of polymerization reactions have been carried out in the reactor.

* * * * *